United States Patent [19]

Orban

[11] Patent Number: 4,535,656

[45] Date of Patent: Aug. 20, 1985

[54] INTEGRAL TENSIONER ASSEMBLY FOR TENSIONING, INSERTING AND REMOVING A STUD

[76] Inventor: Joseph N. Orban, 12 Greensview Dr., Scotch Plains, N.J. 07076

[21] Appl. No.: 392,740

[22] Filed: Jun. 28, 1982

Related U.S. Application Data

[63] Continuation-in-part of Ser. No. 243,138, Mar. 12, 1981, abandoned.

[51] Int. Cl.³ .............................................. B25B 29/02
[52] U.S. Cl. .................................................. 81/57.38
[58] Field of Search ........................................ 81/57.38

[56] References Cited

U.S. PATENT DOCUMENTS

| | | | |
|---|---|---|---|
| 3,877,326 | 4/1975 | Kock et al. | 81/57.38 |
| 3,995,828 | 12/1976 | Orban | 81/57.38 |
| 4,027,559 | 6/1977 | Wallrafen | 81/57.38 |
| 4,047,456 | 9/1977 | Scholz | 81/57.38 |

Primary Examiner—James L. Jones, Jr.
Attorney, Agent, or Firm—Edward R. Weingram

[57] ABSTRACT

An integral tensioner assembly mountable on a stud selectively to insert and remove the stud as from a pressure vessel or the like, or to place the stud under tension so that a holding nut can be freely turned on the stud to tighten or loosen the stud connection to the pressure vessel. The assembly includes a housing which carries a plurality of nuts operable in selective pairs. Each of the pairs of nuts has a separate nut turning mechanism which is carried by the housing.

The integral stud assembly is fastened to the vessel to operate on the stud without the need of extra bulky temporary connection systems.

7 Claims, 10 Drawing Figures

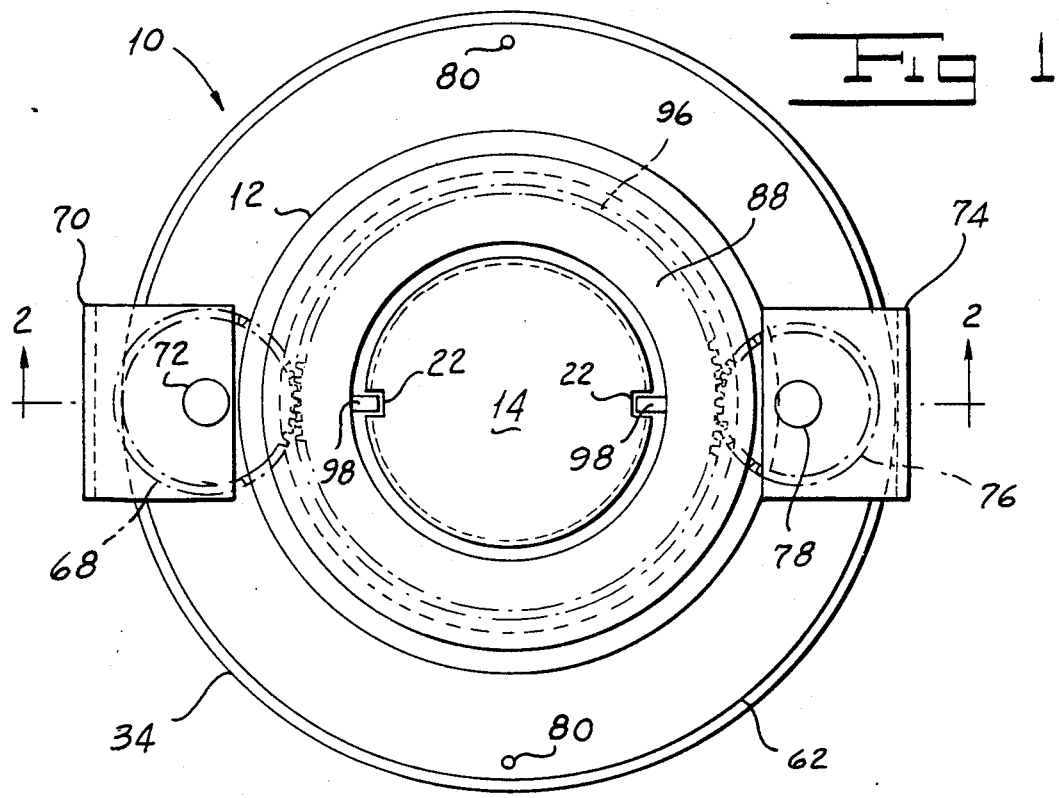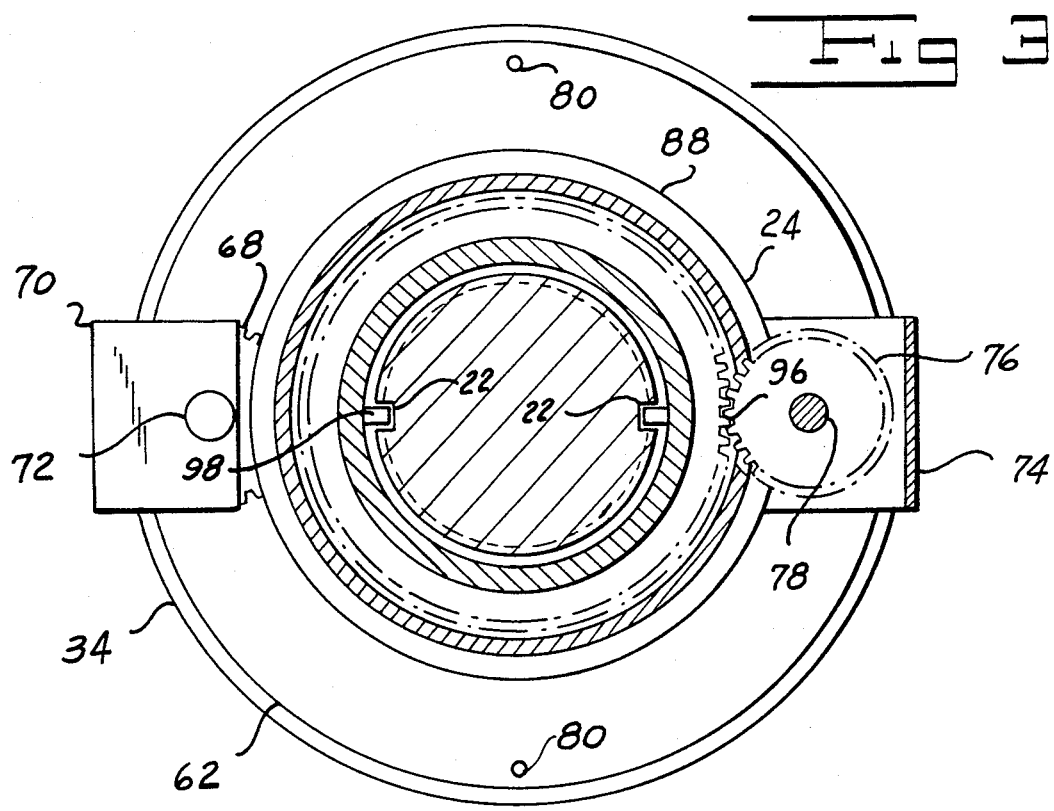

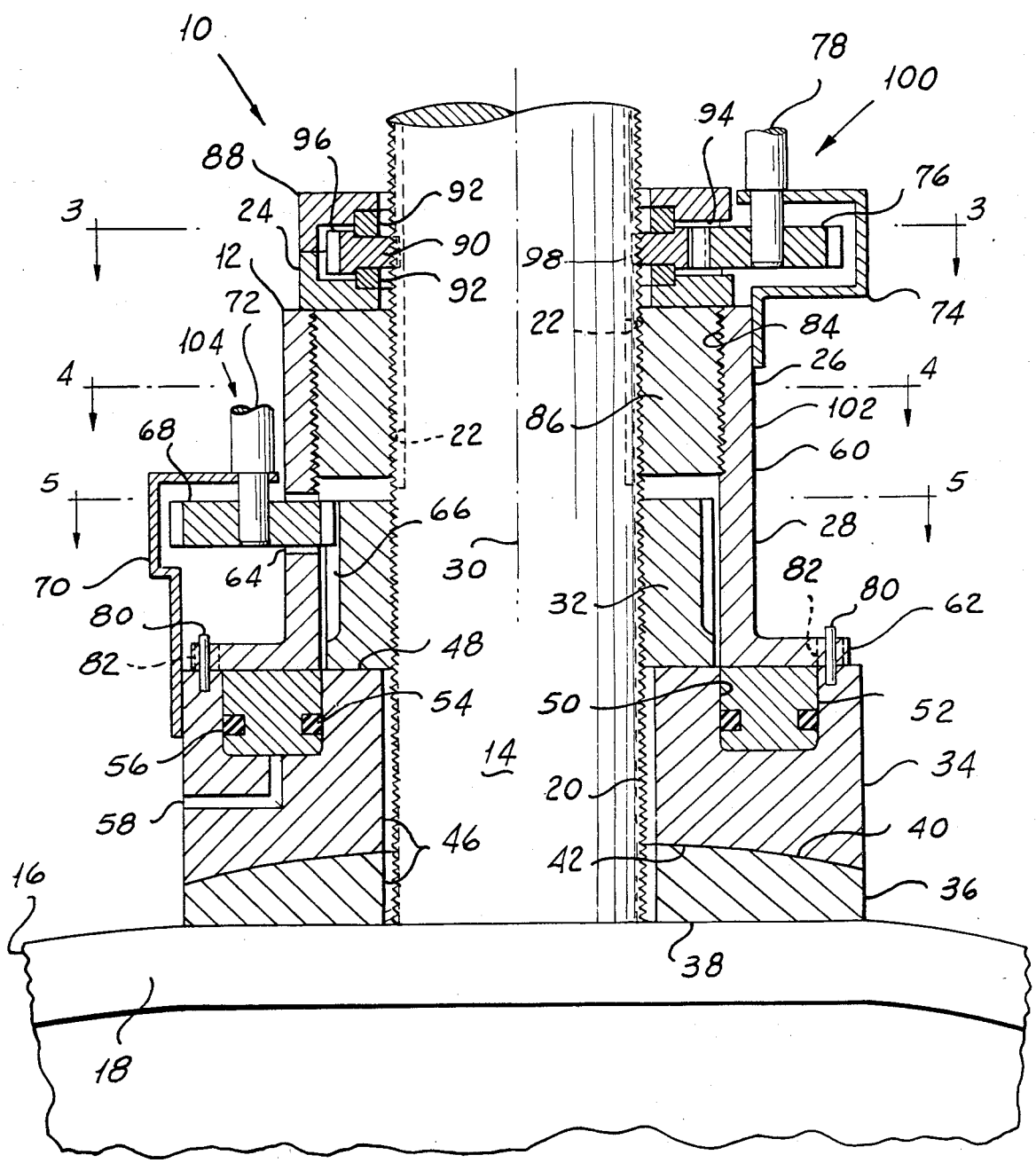

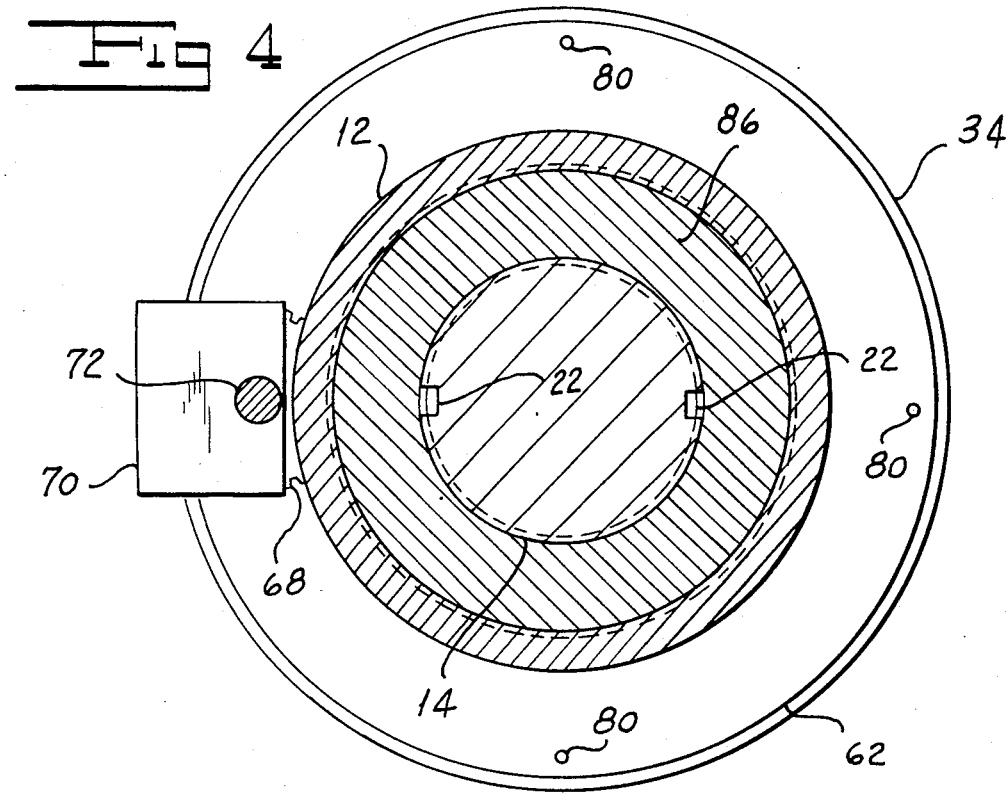
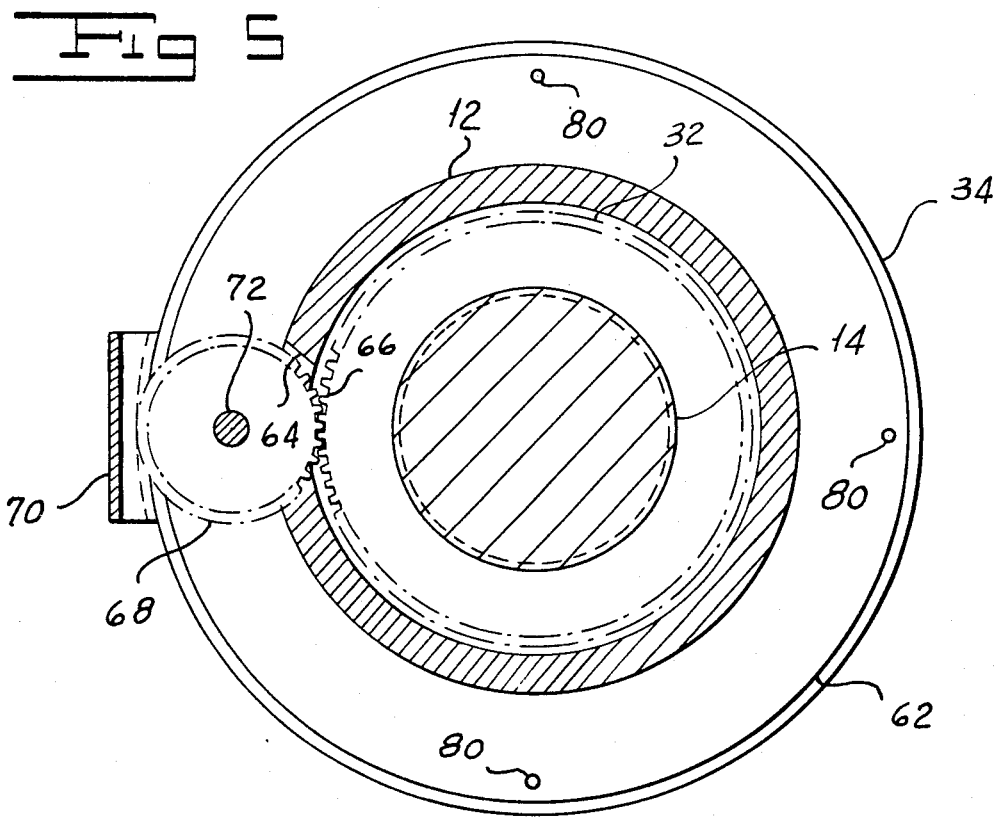

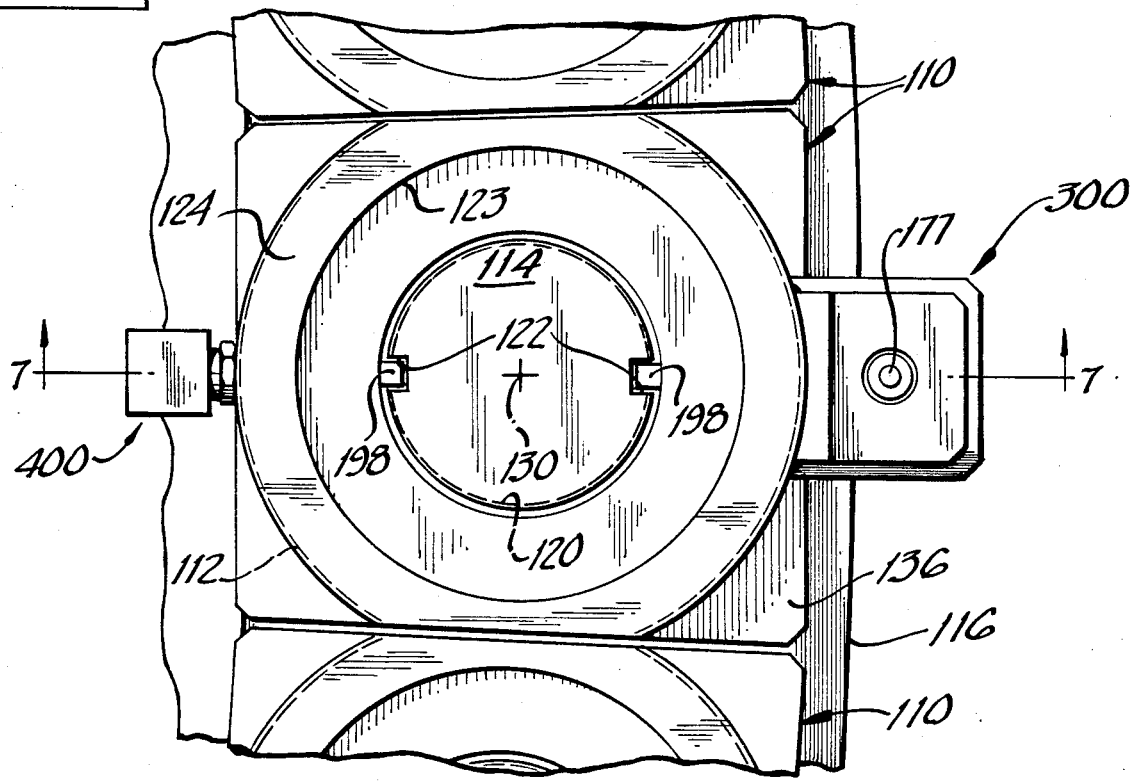
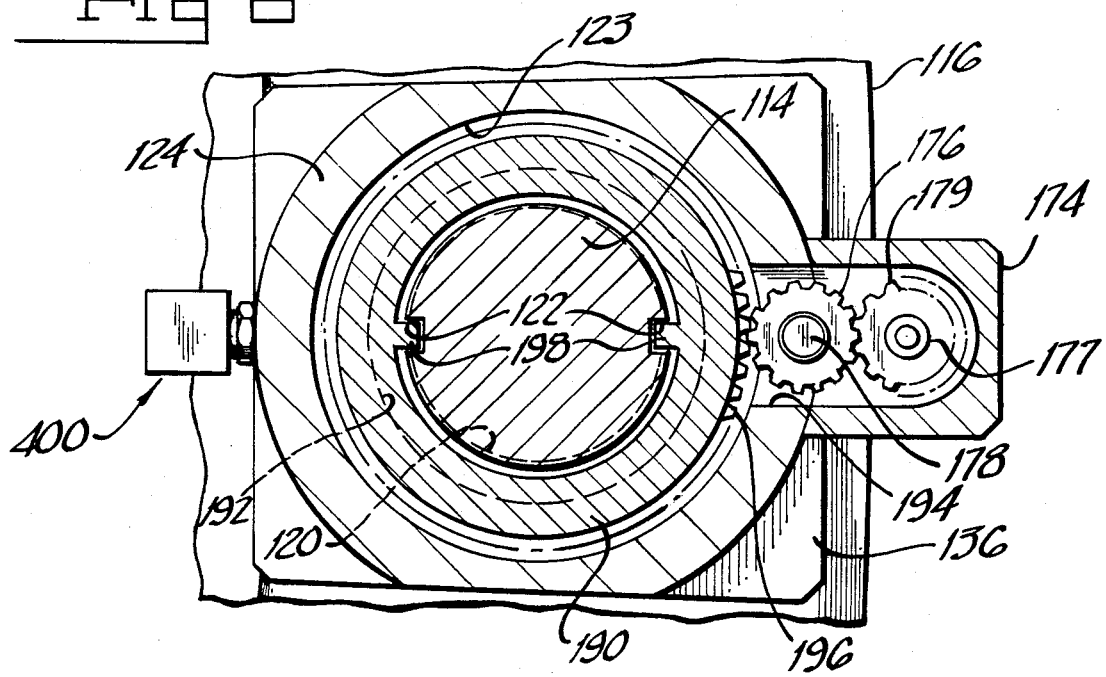

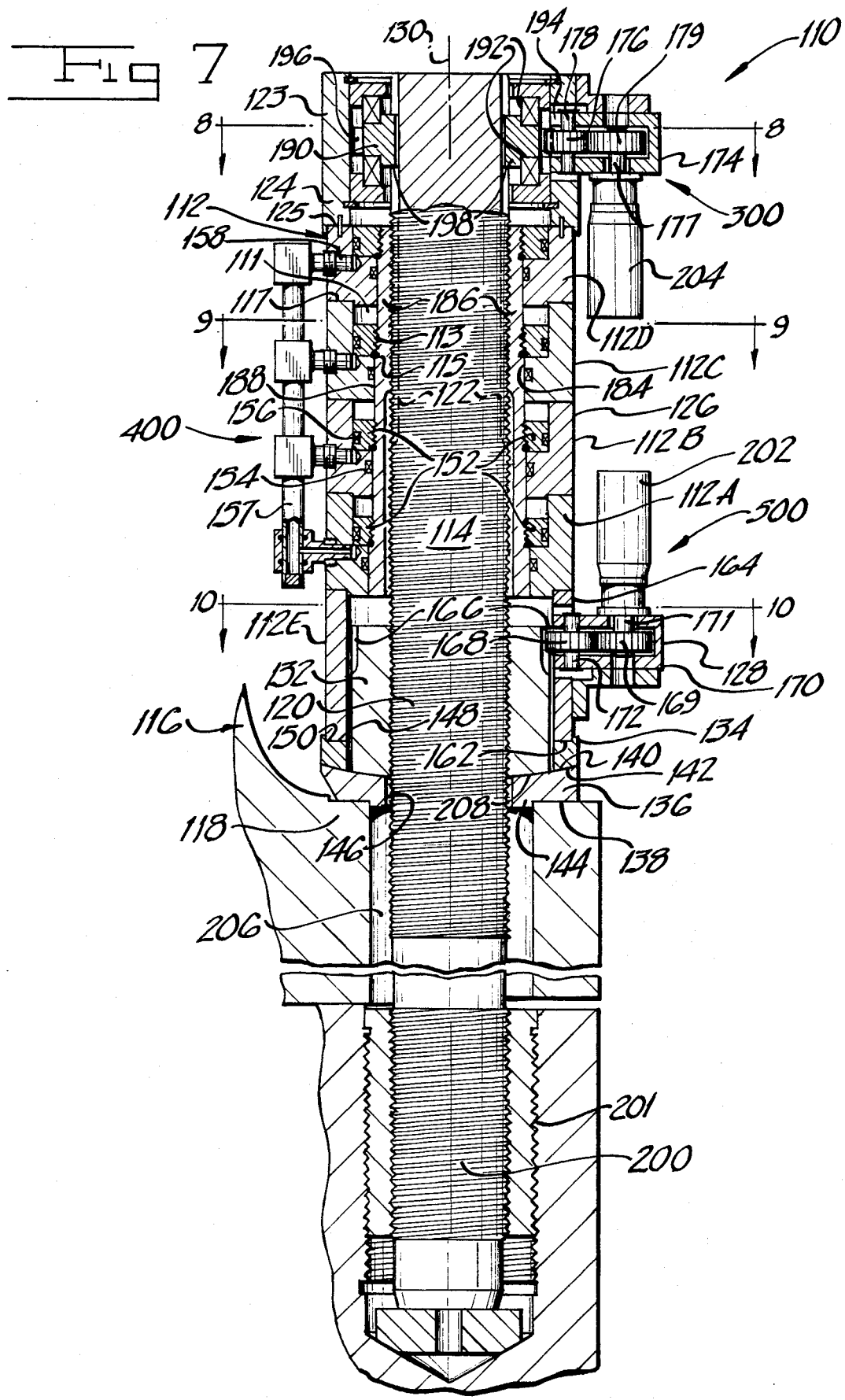

INTEGRAL TENSIONER ASSEMBLY FOR TENSIONING, INSERTING AND REMOVING A STUD

RELATED APPLICATIONS

This application is a continuation-in-part application of U.S. Ser. No. 243,138 filed Mar. 12, 1981, now abandoned, the entire disclosure of which is incorporated herein by reference.

BACKGROUND OF THE INVENTION

Field of the Invention

Devices of the prior art were separately directed at one or the other operations of (1) inserting or removing the stud from the pressure vessel, or (2) tightening or loosening the nut threaded to the stud by tensioning the stud. The prior art devices were bulky and moved from stud to stud therefore requiring additional set-up time and complex connection or clamping components.

SUMMARY OF THE INVENTION

It is an object of the present invention to provide an improved integral stud tensioning, insertion and removal assembly which overcomes the prior art disadvantages.

It is another object of the present invention to provide an improved integral stud tensioning, insertion and removal assembly which is of relatively simple design and construction.

A further object of the present invention to provide an improved integral stud tensioning, insertion and removal assembly which is economical and reliable.

Still another object of the present invention is to provide an improved integral stud tensioning, insertion and removal assembly which can be mounted directly on the vessel.

Still another object of the present invention is to provide an improved integral stud tensioning, insertion and removal assembly which includes selectively operable mechanisms for (1) insertion and removal of the stud in the vessel and (2) tightening or loosening of the stud nut.

Yet a further object of the present invention is to provide an improved integral stud tensioning, insertion and removal assembly which includes a common nut selectively operable as a clamp member in one instance and as a support in another instance. (Note: Support holds stud when stud has been removed from the vessel.)

Yet another object of the present invention is to provide an improved integral stud tensioning, insertion and removal assembly which is contained and carried by a housing.

Another object of the present invention is to provide an improved integral stud tensioning, insertion and removal assembly which is self-aligning on the pressure vessel.

A further object of the present invention is to provide an improved integral stud tensioning, insertion and removal assembly which includes means to rotate the stud.

Still another object of the present invention is to provide an improved integral stud tensioning, insertion and removal assembly which includes means to clamp or drive the stud selectively Still a further object of the present invention is to provide an improved integral stud tensioning, insertion and removal assembly which includes means to selectively operate one or the other of a pair of nuts in nonbinding operation.

Yet another object of the present invention is to provide an improved integral stud tensioning, insertion and removal assembly which includes a power piston means operative to stress the stud during the tensioning operation.

Yet a further object of the present invention is to provide an improved integral stud tensioning, insertion and removal assembly which includes turning means, one for each of the rotational nuts on the stud.

Other objects and advantages will be apparent from the following description of two embodiments of the invention, the novel features of which will be particularly pointed out hereinafter in the claims

BRIEF DESCRIPTION OF THE DRAWINGS

First Embodiment

FIG. 1 is a top plan view of one embodiment of the integral stud assembly of the present invention.

FIG. 2. is a side elevational view, partly in section, taken along line 2—2 of FIG. 1.

FIG. 3 is a top plan view taken along lines 3—3 of FIG. 2.

FIG. 4 is a top plan view taken along lines 4—4 of FIG. 2

FIG. 5 is a top plan view taken along lines 5—5 of FIG. 2.

Second Embodiment

FIG. 6 is a top plan view of another embodiment of the integral stud assembly of the present invention mounted on a flange of a pressure vessel with the integral stud assemblies.

FIG. 7 is a side elevational view, partly in section taken along line 7—7 of FIG. 6.

FIG. 8 is a top plan view taken along line 8—8 of FIG. 7.

Figure 9:
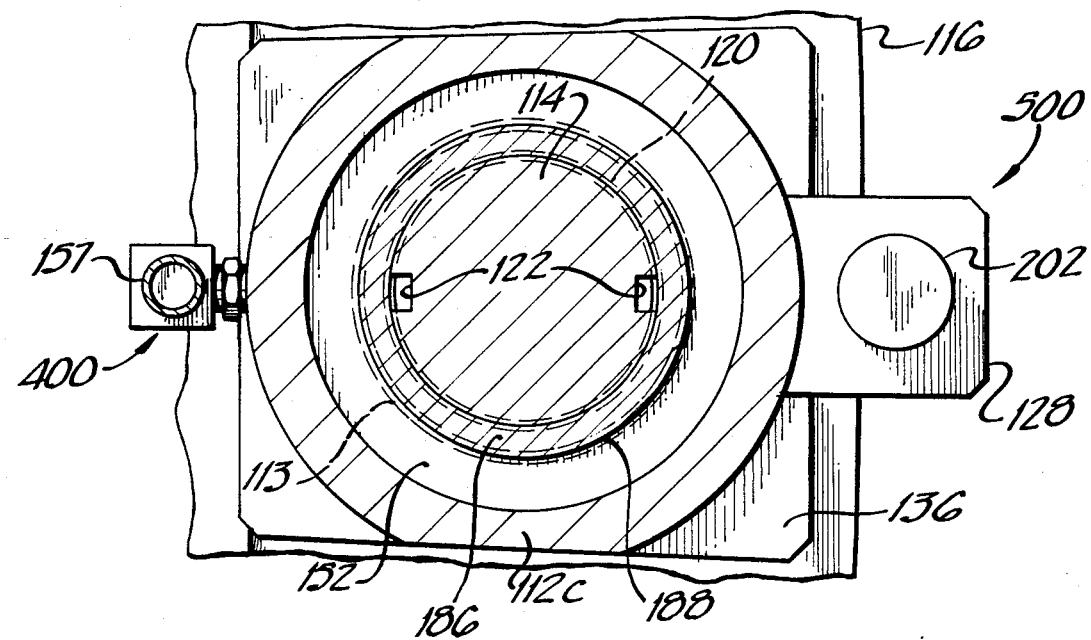

FIG. 9 is a top plan view taken along line 9—9 of FIG. 7.

Figure 10:
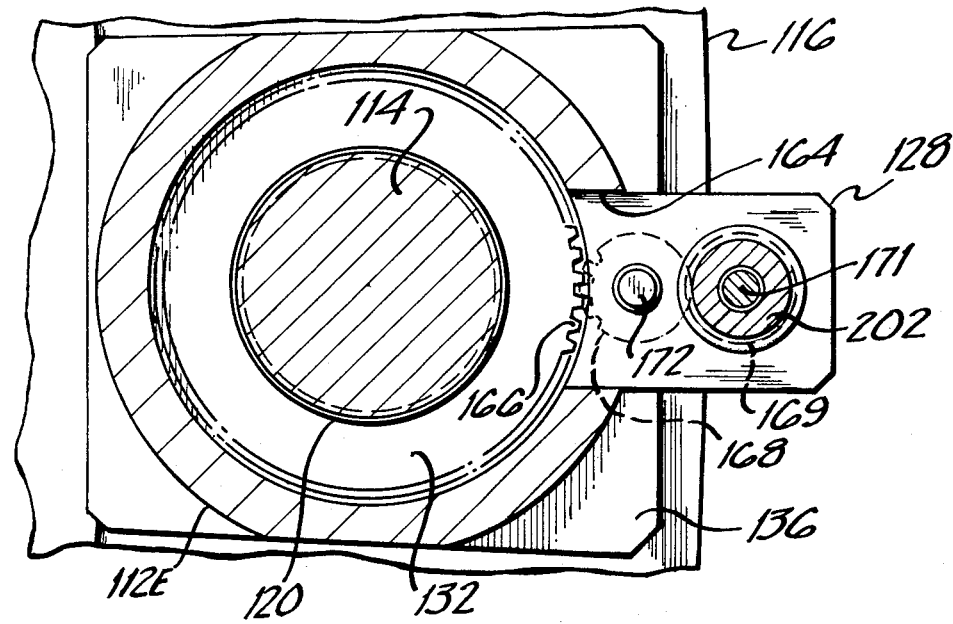

FIG. 10 is a top plan view taken along line 10—10 of FIG. 7.

DESCRIPTION OF THE FIRST EMBODIMENT

In the illustrated first embodiment of this invention, the improved integral stud assembly 10 shown in FIGS. 1 and 2 includes a housing 12 operatively connected to the stud 14. The housing 12 sits atop a cylinder 34 which sits on top of spherical washer 36 which sits on vessel flange 18 of vessel 16, only the top wall or flange 18 of which is shown in FIG. 2.

The stud 14 illustrated in FIGS. 1 and 2 is threaded along the upper most axial periphery by a substantially continuous thread, designated generally by the character reference 20. A pair of diametrically opposite keyways 22 illustrated in Figures 1, 2 and 3 are formed in the upper portion of the stud and extend through the upper section 24 of the housing 12, downwardly to terminate adjacent to the lower part of the mid-section 26 or the upper part of the lower section 28 of the housing 12. The keyways 22 are parallel to the axis 30 of the stud 14 which will be disposed substantially perpendicular to the flange 18. The stud 14 is or will be connected to the vessel 16 by its lower threads (not shown) to be inserted or removed therefrom. Alternately, once connected to the vessel 16, the stud 14 will be tensioned to permit a holding nut 32 to be freely rotated to tighten or loosen the connection of the stud 14 to the vessel 16. The means for connecting or tensioning the stud 12 are all provided by the improved integral stud assembly 10, as explained more fully hereinafter.

The lower section 28 of the housing 12 illustrated in FIG. 2 sits on a cylinder base 34 which includes spherical bearing 36 that has a flat bottom 38 that rests on the flange 18 and an arcuate top 40 to receive the correspondingly shaped bearing 36. The bearing 36 and cylinder 34 each has a central opening 46, 46 through which the stud 14 extends with sufficient clearance so as to be non-constricting regardless of any relative angular shifts along the spherical line between the mating surfaces 40 and 42 to properly align the axis 30 of the stud 14 with respect to the vessel 16.

The top surface 48 of cylinder 34 has an annular recess 50 which extends for the middle third of the radius and starts radially outwardly of the outer circumference of the holding nut 32. The radially inner third of cylinder 34 with top surface 48 is used to seat the nut 32 and form a continuous support from the cylinder base 34 to the flange 18 upon the nut 32 being tightened to the pretensioned stud 14.

An annular piston 52 is disposed within the recess 50 and has an inner packing 54 and an outer packing 56 to seal the bottom portion of the recess 50. Fluid under pressure will be admitted to the bottom of the recess 50 by a duct 58 to force the piston 52 to rise, or on being vented will permit the piston to return to the fully recessed position shown in FIG. 2.

The housing 12 has a radially outwardly extending annular flange or footing 62 formed at its bottom to rest upon the piston 52. The housing 12 has an inner diameter which is larger than the outer diameter of the holding nut 32 so as to provide a clearance therebetween. The housing 12 rises vertically. The mid-section 26 and the lower section 28 extend from the horizontal slot 64 which defines an informal sectional boundary. The slot 64 is illustrated in FIGS. 2 and 5 and is formed on the left side of the housing 12 adjacent the upper end of the holding nut 32, but can be disposed on any side. Nut 32 is splined or toothed at 66 at its outer periphery for engagement with a pinion gear 68 which extends through the horizontal slot 64. The pinion gear 68 is journaled to a lower bracket 70 via a stub shaft 72 affixed to the pinion 68. The stub shaft 72 is connected to be reversably rotated by suitable means (not shown).

The bracket 70 is shown on the left side in Figures 1 and 2. The lower portion of bracket 70 is affixed to the outer upper circumference of the cylinder base 34 and since it carries the pinion 68 will be disposed radially outwardly of, and in general alignment with the slot 64.

An upper bracket 74 is affixed to the upper part of the housing 12 on the right side thereof as viewed in Figures 1, 2 and 3, but could be disposed at other convenient locations. Bracket 74 journals a pinion gear 76 via a stub shaft 78 which is affixed to the pinion 76 and connected to be reversably rotated by a suitable means (not shown). The upper bracket 74 is housed in an upper section 24.

Guide pins 80 shown in FIG. 2 are engaged to the outer third of the upper surface 48 of cylinder base 34 to extend vertically upperwardly therefrom and pass through aligned apertures 82 formed in the flange 62 of housing 12 whereby the piston 52 can raise or lower the housing 12 on a controlled basis.

The upper half of the inner periphery of the housing 12, as illustrated in FIGS. 2 and 4, is internally threaded, as at 84, to receive an engaging member or nut 86 which has both its inner and its outer circumferences threaded so as to be connected between the housing 12 and the stud 14.

The nut 86 is fixedly connected as, for example, by pins (not shown) to the housing 12 in the mid-section 26 of the housing 12 and is connected to the threads 20 radially outwardly of the keyways 22. Alternately, nut 86 can be intergrally formed in the upper portion 26 of housing 12.

The nut 86 is preferably a one-piece construction, but for some applications could be segmented or even chuck-like in construction so as to selectively clamp or release the stud 14, as desired. The nut 86 once threadably connected to the housing 12 will remain in nonrotative engagement therewith in the position substantially shown in FIG. 2.

The thrust bearing casing 24 illustrated in Figures 1, 2 and 3 is disposed at the top of the housing 12 and nut 86 in any suitable manner. A rotary drive nut 90 is journaled by an upper and a lower thrust bearing or lubricated bushing 92, 92 in the casing 24 which has an opening on its right side at 94 as viewed in FIG. 2 through which the pinion 76 extends to engage the external splines 96 of the nut 90. The nut 90 has a pair of diametrically opposite square ended drive keys 98, 98 which project radially inward one into each of the keyways, 22, 22 in stud 14. The keys 98 fit within the keyways 22 so as to provide sufficient clearance to permit relative axial motion therebetween.

The housing 12 includes substantially all of the hardware needed for the integral tensioner assembly 10 and can be permanently carried by the vessel 16. The integral tensioner assembly 10 is a composite of a stud insertion and removal mechanism 100, and a stud tensioning or pull system 102 of which, among other components, the engaging nut 86 is common to both.

Assuming that the stud 14 is connected to the vessel through flange 16 which rests on the vessel and threads into a blind hole in the vessel as illustrated in FIG. 2 whenever the stud 14 is to be tensioned, the duct 58 will be suitably connected to a source (not shown) of hydraulic fluid selectively to pressurize the cylinder 34 and force the piston 52 to rise upwardly The engaging nut 86 clamps the stud 14 by the interconnection of the respective threads at a fixed axial position relative to the flange 18 and the housing 12 which presents continuous solidly supported components of the cylinder base 34 and the sleeve 60 which in turn has the nut 86 affixed thereto. Thus, when the piston 52 is pressurized, the force exerted downwardly through the base 34 is absorbed by the flange 18 and there is no downward movement of the housing 12. Instead, the piston 52 which is in broad engagement with the footing 62 of the housing 12 will cause the housing 12 to rise vertically upwardly to place the stud tensioning system 102 in operation.

The housing 12 in turn forces the nut 86 and the portion of connected stud 14 also to rise vertically upward. Accordingly, the stud 14 is placed in tension and is forced to extend a predetermined axial distance.

Below the engaging nut 86, the holding nut 32 will rise along with the extension of stud 14. The splines 66 of the nut 32 will permit relative sliding of the nut 32 past the axially fixed pinion 68 to which its splines 66 are engaged. Likewise, the keys 98 will remain in the keyways 22 in constricting free engagement which permits relative axial motion even if one or the other should be shifted axially a different distance during the tensioning operation.

While the stud 14 is held under tension by the pull system 102, the holding nut 32 will be rotated downwardly to place it in tight contact with the top surface 48 of the base 34, as shown in FIG. 2.

The nut 32 will be rotated by a nut turning mechanism 104 which includes the pinion 68, the shaft 72 and a reversible shaft rotating means (not shown) which turns the shaft 72 to rotate the pinion 68 in engagement with the splines 66 of the nut 32. As the nut 32 rotates downwardly, the axially extending splines 66 permit relative sliding motion between the nut 32 and the pinion 68. Once the nut 32 tightens the stud 14 to the flange 18 via the cylindrical base 34, the hydraulic fluid can be vented or discharged to release the pressure of the piston 52 so as to release the tension from the pull system 102 but keep the tension on the stud 14. Thereafter, the hydraulic fluid connection to the duct 58 can be removed if desired. The housing 12 can conveniently remain in place upon the vessel.

The stud insertion and removal mechanism 100 is carried on the uppermost housing 24 and has its rotary drive nut 90 axially fixed so that then the tensioning system 10 is placed upon the vessel 16 with the stud 14 aligned to the threaded aperture (not shown) on the flange 18, and the nut 90 will be and remain a fixed axial distance from the flange 18 as it is journaled by the pair of thrust bearings 92, 92 to the upper housing 24 which is disposed on the top of the housing 12.

A reversible shaft rotating means (not shown) will turn the shaft 78 to rotate the pinion 76 to in turn rotate the rotary drive nut 90 whose keys 98 engage the keyways 22, thus causing the stud 14 to rotate. While it would be possible to rely upon the threaded aperture of flange 18 to draw the rotating stud 14 downwardly, a positive downward driving force is preferably supplied by the inner threads of the engaging member 86 which is itself prevented from rotation by the non-rotatable threaded engagement of the outer threads thereof with the threads 84 of the housing 12. Thus, rotation of the nut 90 will rotate the stud 14 and cause it to be threadably connected to the flange 18 prior to operation of the pull system 102.

Since the holding nut 32 is held non-rotatively by the pinion 68 once contacting the base 34 it would cease to rotate.

During rotation of the nut 90 the keyway 22 will slide axially relative the key 98 as the stud 14 is driven downwardly into its connection within the flange 18 by the slope of the respective threads.

The stud removal operation is substantially the same as above-described except that the nut 90 is driven in the opposite direction to produce an upward motion of the stud 14 relative the flange 18.

It is apparent that the plurality of nuts carried by the housing 12 work in selective pairs, with the middle nut 86 playing a part in both operations of the integral stud assembly 10. It transmits forces during the tensioning operation and acts as a positioning device for the apparatus during the stud insertion and removal operation.

DESCRIPTION OF SECOND EMBODIMENT:

In the second embodiment of this invention, the improved integral stud assembly 110 is depicted in Figures 6 thru 10. This particular embodiment of the stud assembly is suitable when a single type piston means, as depicted in the first embodiment, is not suitable due to the large diameters of the stud requiring extreme forces to tension the stud. FIG. 7 depicts a plurality of assemblys 110 on the flange 118 of a vessel 116.

The integral stud assembly 110 includes a housing 112. The housing 112 sits atop an upper washer 134 which sits on top of spherical washer 136 which sits on vessel flange 118 of vessel 116.

The stud 114 is threaded along the uppermost axial periphy by a substantially continuous thread, designated generally by the character reference 120. A pair of diametrically opposite keyways 122 are formed in the upper portion of the stud and extend through the upper section 124 of the housing 112, downwardly to terminate near the middle part of the midsection 126 housing 112b. The keyways 122 are parallel to the axis 130 of the stud 114 which will be disposed substantially perpendicular to the flange 118. The stud 114 is connected to the vessel 116 by its lower threads 200 to be inserted or removed from blind hole 201, Alternately, once connected to the vessel 116, the stud 1 will be tensioned to permit a holding nut 132 to be freely rotated to tighten or loosen the connection of the stud 114 to the vessel 116. The means for connecting or tensioning the stud 114 are all provided by the improved integral stud assembly 110 as explained more fully hereinafter.

The lower section 128 of the housing 112 sits on the upper washer 134 which includes a flat upper surface 148 and an arcuate lower surface 142 which rests on the arcuate upper surface 140 of the lower spherical washer 136. The spherical washer 136 has a portion of its outer periphery 138 resting upon the flange 118. Assisting in the maintenance of the position of washer 136 is lip 144 which extends into stud hole 206 to assist in centering the washer. The lower washer 136 has a central opening 146 through which the stud 114 extends with sufficient clearance so as to be non-constricting regardless of any relevant angular shifts along the spherical line between the mating surfaces 140 and 142 to proper align the axis 130 of the stud 114 with respect to the vessel 116.

Nut 132 is provided with arcuate bottom surface 208 to permit the proper seating of the nut 132 on the arcuate top 140 of spherical lower washer 136.

The top surface 148 of upper washer 134 has an annular recess 150 which extends outwardly for about three quarters of the radius of the washer. This annular recess 150 in the top surface 148 supports the footing 162 of housing 112.

The housing 112 has an inner diameter at its bottom which is larger than the outer diameter of the holding nut 132 so as to provide a clearance therebetween.

Atop footing 162 the housing 112 is provided with a plurality of annular rings 112A, B, C, and D placed one upon the other. The top surface of each annular housing ring matingly engages with the lower surface of the housing ring above. The mid-section 126 includes the annular rings, and the lower section 128 extends from the horizontal slot 164 which defines an informal sectional boundary. The slot 164 depicted in FIG. 7 is formed on the right side of the housing 112 adjacent the upper end of the holding nut 132, but can be disposed on any side. Holding nut 132 is splined or toothed at 166 at its outer periphery for engagement with a pinion gear 168 which extends through the horizontal slot 164. The pinion gear 168 is journaled to a lower bracket 170 via a stud shaft 172 affixed to the gear 168. The gear 168 may then be reversibly rotated by a reversible motor 202 which drives gear 169 through shaft 171.

The lower portion of bracket 170 is affixed to the outer circumference of housing 112 and since it carries the gears 168, 169, motor means 202 and shafts 171, 172, it will be disposed radially outwardly of, and in general alignement with the slot 164.

An upper bracket 174 is affixed to the upper part of the housing 112 via 124 on the right side thereof as viewed in FIG. 7 but could be disposed at other convenient locations. Bracket 174 journals a pinion gear 176 via a stud shaft 178 which is affixed to the pinion gear 176. Pinion gear 176 may be reversibly rotated by a motor means 204 driving shaft 177 and gear 179. The upper bracket 174 is housed in upper section 124.

An engaging member or nut 186 is threadably connected to stud 114 by threads 120 radially outwardly of the keyways 122. The engaging member 186 is preferably of one piece construction, but for some applications could be segmented or even chuck like in construction so as to selectively clamp or release the stud 114 as desired.

Each of the annular housing rings 112A-D, surround the outside of engaging member 186 and have an annular opening 111 to accommodate the annular piston 152. The annular pistons 152 are attached to the engaging member 186 by threads 113 on the exterior of the engaging member 186 and the interior of the annular pistons 152. The annular housing rings 112A-112D are then provided with a connecting means to ducts 158 to provide hydraulic fluid below the pistons 152. The annular housing rings 112A-112D are additionally provided with an annular recess for inner packings 154. The piston rings 152 are also provided with an annular recess for outer packings 156. The threads 113 are additionally sealed between the annular pistons 152 and engaging member 186 by sealing rings 115.

The inner periphery of each of the housing rings 112A-D, as illustrated in FIG. 7, is provided with an axially slidable internal surface 184 so that it may axially slide over engaging member 186. Engaging member 186 has its inner circumference threaded and its outer circumference provided with a surface capable of axially sliding along 184.

The thrust bearing casing 123 is disposed at the top of the housing 112A-112D and engaging member 186 in any suitable manner. A rotary drive nut 190 is journaled by an upper and a lower thrust bearing or lubricating bushing 192, 192 in the casing 123 which has an opening on its right side at 194 through which the pinion gear 176 extends to engage the external splines 196 of the nut 190. The nut 190 has a pair of diametrically opposite square ended drive keys 198, 198 which project radially inward into each of the keyways 122, 122 in stud 114. The keys 198 fit within the keyways 122 so as to provide sufficient clearance to permit relative axial motion therebetween.

The entire housing 112A-112E contains substantially all of the hardware needed for the integral tensioner assembly 110 and can be permanently carried by the vessel 116. The integral tensioner assembly 110 is a composite of a stud insertion and removal mechanism 300, and a stud tensioning or pull system 400 of which among other components, the engaging member or nut 186 is common to both.

Assuming that the stud 114 is connected to the vessel through flange 116 which rests on the vessel and threads into a blind hole 201 in the vessel as illustrated in FIG. 7, whenever the stud 114 is to be tensioned, hydraulic fluid is introduced into the housing below the annular pistons 152 through manifold 157 to ducts 158, causing the pistons 152 to rise upwardly. The engaging member 186 clamps the stud 114 by the interconnection of the respective threads at a fixed axial position relative to the flange 118. Additionally, the annular pistons 152 are attached to the outside circumference of the engaging member or nut 186. Thus, when the pistons 152 are pressurized, the force exerted downwardly through the housing is absorbed by flange 118 and there is no downward movement of the housing 112. Instead, the pistons 152, which are attached to the engagement means 186 cause the engagement means 186 to rise vertically upward to place the stud tensioning system 400 into operation causing tension upon the stud 114. Accordingly, the stud 114 is placed in tension and is forced to extend a predetermined axial distance.

Below the engaging means or nut 186, the holding nut 132 will rise along with the extension of stud 114. The splines 166 of the nut 132 will permit relative sliding of the nut 132 past the axially fixed pinion 168 to which its splines 166 are engaged. Likewise, the keys 198 will remain in the keyways 122 in constricting free engagement which permits relative axial motion even if one or the other should be shifted axially to a different distance during the tensioning operation. While the stud 114 is held under tension by the stud tensioning system 400, the holding nut 132 will be rotated downwardly to place it in tight contact with the arcuate upper surface (140) of spherical washer 136. The nut 132 will be rotated by a nut turning mechanism 500, which includes the pinion gear 168, the shaft 172, and the reversible shaft rotating means which includes motor means 202, shaft 171, and gear 169 which turns the gear 168 on shaft 172 to engage the gear 168 with the splines 166 of the nut 132. As the nut 132 rotates downwardly, the axially extending splines 166 permit relative sliding motion between the nut 132 and the pinion gear 168. Once the nut 132 tightens the stud 114 to the flange 118 via the spherical washer 136, the hydraulic fluid can be vented or discharged to release the pressure of the pistons 152 so as to release the tension from the pull system 400 but keep the tension on a stud 114. Thereafter, the hydraulic fluid connection to the manifold 157 can be removed if desired. The housing 112 can conveniently remain in place upon the vessel.

The stud insertion and removal mechanism 300 is carried on the uppermost housing 124 and has its rotary drive nut 190 axially fixed so that when the stud assembly 110 is placed upon the vessel 116 with the stud 114 aligned to the threaded aperture 200 on the flange 118, the nut 190 will be and remain a fixed axial distance from the flange 118 as it is journaled by the pair of thrust bearings 192, 192 to the upper housing 124 which is stationarily disposed on the top of the housing 112 via member 124.

The reversible shaft rotating means which includes motor means 204, shaft 177, and gear 179 will rotate the pinion gear 176 on shaft 178 to in turn rotate the rotary drive nut 190 whose keys 198 engage the keyways 122, thus causing the stud 114 to rotate. While it would be possible to rely upon the threads 200 to draw the rotating stud 114 downwardly, a positive downward driving force is preferably supplied by the inner threads of the engaging member 186 which is itself prevented from rotation by the non-rotatable frictional engagement of the outer surfaces of engaging member 186 along surfaces 188 with the inner surface of the housing rings 112 along surface 184. Thus, rotation of the nut 190 will rotate the stud 114 and cause it to be threadably connected to the flange 118 prior to operation of the pull system 400.

Since the holding nut 132 is held non-rotatively by the pinion 168 once contacting the spherical lower washer 136 it would cease to rotate.

During the rotation of the nut 190 the keyway 122 will slide axially relative to the key 198 as the stud 114 is driven downwardly into its connection within the flange 118 by the slope of the respective threads.

The stud removal operation is substantially the same as above described except that the nut 190 is driven in the opposite direction to produce an upward motion of the stud 114 relative to the flange 118.

It is apparent that the plurality of nuts carried by the housing 112 work in selective pairs with the engaging member or middle nut 186 playing a part in both operations of the integral stud assembly 110. It transmits forces during the tensioning operation and acts as a positioning device for the apparatus during the stud insertion and removal operation.

It should be pointed out that the integral tensioner of the present invention as set forth in this application is intended for series engagement with other integral tensioning devices on other studs normally used in securing the top of a pressure vessel. Therefore, the hydraulic connections are such as to, in most cases be of a permanent nature connected to a manifold which in turn would connect to other tensioners. Alternatively, there could be an outlet which would connect the hydraulic circuit to the adjacent tensioners. When the tensioning function is not anticipated, the major hydraulic prime mover or power source would be removed.

It should also be pointed out that the structures of the present invention enables access to the pistons while the stud is under tension. Since the position of the annular pistons 52 and 152 are disposed, respectively, outside the diameter of the holding nut 32, and above the holding nut 132, it is possible to remove the housing 12, 112 and the upper housing 24, 124. The upper housing 24, 124 can be disengaged by merely sliding it along keyways 22, 122, and, in the case of the multi-piston apparatus, removing fastening 125 connecting housing 174 to the uppermost cylinder 112D. In the single cylinder embodiment, housing 12, can be disengaged by removal of pins 80 and threading engaging member 86, up the threads 20, of stud 14. This will leave the piston 52, exposed or accessible. In this condition, it can be serviced or repaired or modified as necessary for any further operations.

To remove the multi piston tensioner from the flange without affecting the stud 114, the following procedure is used: First, housing 124 is removed as a complete assembly by removing fasteners 125 connecting housing 124 from upper cylinder 112D. The upper or fourth tier piston in housing 112D is then unscrewed by appropriate tools and threaded up member 186 and removed, and upper cylinder 112D is then slid up member 186 and removed. The process is then repeated for the third, second, second and first tier pistons in cylinders 112C, B, and A respectively, as and if desired until the desired point of access is revealed. Note, that since the pistons lie completely outside the radius or height of the fastening nut 32, 132, that the tensioning on the stud is not affected in any way by the servicing of the pistons.

It will be understood that various changes in the details, materials, arrrangements or parts in operating conditions which have been herein described and illustrated in order to explain the nature of the invention may be made by those skilled in the art within the principles and scope of the invention. What is claimed:

1. A stud rotation system for mounting and removing a stud from a pressure vessel comprising:
    (a) a housing disposed about the stud,
    (b) rotation means rotatably mounted on the housing adapted to rotate the stud,
    (c) drive means engaging the rotation means to rotate the rotation means and the stud whereby the stud will be threadably inserted or removed from the pressure vessel,
    (d) holding means disposed within the housing, to engage the stud and to permit turning of and axial motion of the stud,
    (e) the holding means includes an engaging nut affixed to the housing threadably receiving the stud to permit relative axial motion therebetween on rotation of the nut or the stud,
    (f) the housing has a base,
    (g) a sleeve disposed on the base and circumferentially spaced from the stud,
    (h) the engaging nut is affixed to the sleeve in axially spaced relation to the base, and
    (i) the sleeve comprises a plurality of annular housing rings axially disposed upon each other, each ring having a portion of its inner surface frictionally affixed to the engaging nut.

2. The system of claim 1, wherein a plurality of axially disposed annular piston rings are mounted to the engaging nut, each piston ring being mounted within an annular housing ring, the pistons being adapted selectively to raise or lower the engaging nut whereby the stud will be forced into tension or released via the engaging nut connection.

3. The system of claim 2, wherein:
    (a) a holding nut is connected to the stud within the housing,
    (b) the sleeve has an access opening, and includes,
    (c) turning means extendable through the access opening to rotatably engage the holding nut whereby upon the stud being stressed the holding nut will be selectively tightened or loosened and to rest upon the base or be raised therefrom.

4. An integral tensioning assembly for tensioning a fastening member axially extending from a body comprising:
    (a) a base resting on the body in registration with said fastening member;
    (b) a housing resting on said base in registration with said fastening member and radially spaced therefrom;
    (c) a fastening nut adapted to coact with the fastening member;
    (d) a connecting member disposed between said housing and said fastening member radially connecting said fastening member and said housing;
    (e) extension means coacting with said housing to axially displace said connecting member relative said base to tension said fastening member,
    (f) said extension means coacting with said housing to axially displace said connecting member comprise annular piston means axially connected with said connecting member, (g) said annular piston means comprise a plurality of pistons axially spaced from each other within said housing, and (h) each of said plurality of annular pistons are threadably connected with said connecting member.

5. The assembly of claim 4 wherein:

(a) said housing comprises a plurality of axially aligned housing rings; and (b) each of said plurality of annular pistons is disposed within a separate housing ring.

6. The assembly of claim 5 further comprising:

(a) annular cylinder means for said piston means formed in each of said housing rings in which an annular piston is disposed; and (b) sealing means in said housing ring axially connecting with said connecting member.

7. A stud rotation system for mounting and removing a stud from a pressure vessel comprising:

(a) a housing disposed about the stud, (b) rotation means rotatably mounted on the housing adapted to rotate the stud, (c) drive means engaging the rotation means to rotate the rotation means and the stud whereby the stud will be threadably inserted or removed from the pressure vessel, (d) holding means disposed within the housing, to engage the stud and to permit turning of and axial motion of the stud, (e) the holding means includes an engaging nut affixed to the housing threadably receiving the stud to permit relative axial motion therebetween on rotation of the nut or the stud, (f) the housing comprising:
a base,
a sleeve is disposed on the base and circumferentially spaced from the stud, (h) the engaging nut is affixed to the sleeve in axially spaced relation to the base, (i) a piston is moveably mounted in the base under the sleeve and adapted selectively to raise or lower the sleeve whereby the stud will be forced into tension or released via the engaging nut connection, and (j) a plurality of axially disposed annular piston rings are mounted to the engaging nut, each piston ring being mounted within an annular housing ring, the pistons being adapted selectively to raise or lower the engaging nut whereby the stud will be forced into tension or released via the engaging nut connection.

* * * * *